United States Patent
Kandasamy et al.

(10) Patent No.: US 8,826,244 B2
(45) Date of Patent: *Sep. 2, 2014

(54) PROVIDING PROGRAMMING SUPPORT TO DEBUGGERS

(75) Inventors: Madhusudanan Kandasamy, Bangalore (IN); Vidya Ranganathan, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 135 days.

This patent is subject to a terminal disclaimer.

(21) Appl. No.: 13/431,391

(22) Filed: Mar. 27, 2012

(65) Prior Publication Data
US 2012/0198424 A1 Aug. 2, 2012

Related U.S. Application Data

(63) Continuation of application No. 12/625,840, filed on Nov. 25, 2009.

(51) Int. Cl.
  *G06F 9/44* (2006.01)
  *G06F 9/45* (2006.01)
  *G06F 11/00* (2006.01)
  *G06F 11/36* (2006.01)

(52) U.S. Cl.
  CPC ................ *G06F 11/3644* (2013.01)
  USPC ........... 717/130; 717/124; 717/127; 717/154; 717/158; 714/25; 714/35

(58) Field of Classification Search
  None
  See application file for complete search history.

(56) References Cited

U.S. PATENT DOCUMENTS

| | | | |
|---|---|---|---|
| 4,819,234 A | 4/1989 | Huber | |
| 5,265,254 A * | 11/1993 | Blasciak et al. | 717/130 |
| 5,675,803 A | 10/1997 | Preisler et al. | |
| 6,216,237 B1 | 4/2001 | Klemm et al. | |

(Continued)

FOREIGN PATENT DOCUMENTS

| JP | 04155540 A | 5/1992 |
|---|---|---|
| JP | 08179940 A | 7/1996 |
| JP | 2005115619 A | 4/2005 |

OTHER PUBLICATIONS

Heydarian, Habib; "How to Edit Code When Debugging a 64-Bit Application;" Microsoft Blog; 3pages; Oct. 12, 2009; Debugging Visual Studio; Microsoft Corporation.

(Continued)

*Primary Examiner* — Michael Sun
(74) *Attorney, Agent, or Firm* — D'Ambrosio & Menon, PLLC; Usha Menon

(57) ABSTRACT

Method for providing programming support to a debugger are disclosed. The method includes defining at least one debugger programming statement, and instructing the debugger to execute the at least one debugger programming statement which modifies a least a portion of the computer program during execution of the computer program without recompiling the computer program. The debugger may be instructed to execute the at least one debugger programming statement at a specified position of the computer program. The at least one debugger programming statement may include a delete instruction that instructs the debugger to prevent one or more programming statements at a specified position in the computer program from being executed. The debugger may be instructed to execute the at least one debugger programming statement instead of one or more programming statements at a specified position in the computer program without recompiling the computer program.

13 Claims, 4 Drawing Sheets

(56) References Cited

U.S. PATENT DOCUMENTS

| | | |
|---|---|---|
| 6,427,232 B1 | 7/2002 | Ku et al. |
| 6,490,721 B1 | 12/2002 | Gorshkov et al. |
| 7,203,926 B2 | 4/2007 | Bogle et al. |
| 7,353,501 B2 | 4/2008 | Tang et al. |
| 7,367,025 B1 | 4/2008 | Nikolov et al. |
| 2002/0073398 A1* | 6/2002 | Tinker ............................ 717/110 |
| 2003/0212983 A1* | 11/2003 | Tinker ............................ 717/110 |
| 2004/0205704 A1 | 10/2004 | Miller, Jr. et al. |
| 2008/0120604 A1* | 5/2008 | Morris ........................... 717/128 |
| 2008/0244243 A1* | 10/2008 | Kalra ............................. 712/225 |

OTHER PUBLICATIONS

Staheli, David G; "Enhanced Debugging with Edit and Continue in Microsoft Visual C++ 6.0" Visual C++ 6.0 Technical Articles; Aug. 1998; 17 pages; Microsoft Corporation.

USPTO NonFinal Office Action dated Apr. 24, 2013 for co-pending parent U.S. Appl. No. 12/625,840.

USPTO Final Office Action dated Sep. 23, 2013 co-pending parent U.S. Appl. No. 12/625,840.

* cited by examiner

PROVIDING PROGRAMMING SUPPORT TO DEBUGGERS

PRIORITY

This application is a continuation of U.S. patent application Ser. No. 12/625,840 filed Nov. 25, 2009.

BACKGROUND

Debugging a computer application is an integral part of ensuring that the application is capable of performing its required functions without error. As most software developers will attest to, the process of debugging a computer application can at times become extremely tedious, particularly when the application includes several thousand lines of code. The source code of a computer application must be compiled before it can be executed. A debugger operates on compiled source code and allows a user to monitor the execution of the computer application in order to detect errors, or "bugs", in the software code that are causing the application not to perform its expected functions. Typically, debuggers offer functions such as "single-stepping" (i.e. running a program in a step-by-step manner), "breaking" (i.e. pausing the program to examine the current state at some specified instruction or event by means of a breakpoint), and tracking changes in the values of variables throughout the execution of the program. The invention relates generally to debuggers for debugging computer applications, and more particularly to methods for providing programming support to debuggers.

SUMMARY

In one embodiment of the invention, a method for providing programming support to a debugger that debugs a computer program embodied on a computer-readable medium is disclosed. The method includes defining at least one programming statement in a debugger programming language that the debugger is configured to interpret, and instructing the debugger to execute the at least one programming statement, such that the at least one programming statement modifies at least a portion of the computer program during execution of the computer program without recompiling the computer program.

This and other embodiments of the invention are described in detail with reference to the following drawings.

DETAILED DESCRIPTION

Figure 1:
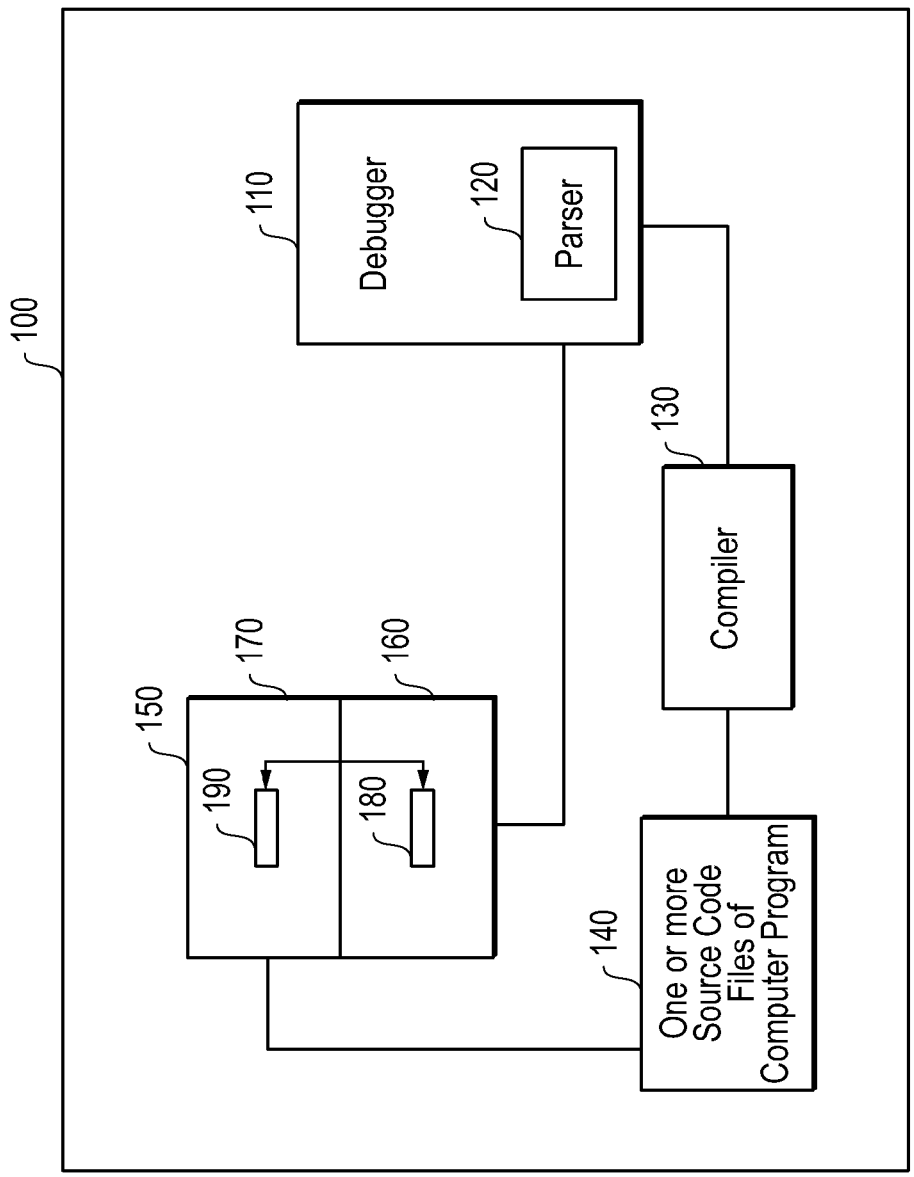
FIG. 1 sets forth a block diagram illustrating a system in accordance with one or more embodiments of the invention.

As will be appreciated by one skilled in the art, embodiments of the invention are embodied as a method. Accordingly, embodiments of the invention may take the form of an entirely hardware embodiment, an entirely software embodiment (including firmware, resident software, micro-code, etc.) or an embodiment combining software and hardware embodiments that may all generally be referred to herein as a "circuit," "module" or "system." Furthermore, embodiments of the invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a system 100 in accordance with one or more embodiments of the invention includes a debugger 110, a region 140 storing one or more source code files of a computer program that the debugger is configured to debug, a memory unit 150, and a compiler 130. The debugger 110 includes at least one parser 120. The memory unit 150 includes a computer program address space 170 and a debugger address space 160. The memory unit 150 may be a combination of one or more smaller memory units and may be of any suitable type. Each of the computer program address space 170 and the debugger address space 160 may include memory addresses storing the value of variables declared in the computer program and the debugger, respectively.

The system 100 includes a compiler 130 that transforms the source language of the computer program stored in region 140 to another language in order to generate an executable program. More specifically, the compiler may include a parser (not shown) that analyzes the program code and generates an internal representation of the program code during the compilation process. The debugger 110 is capable of operating on the compiled source code generated by the compiler 130 in order to debug the computer program.

In accordance with one or more embodiments of the invention, the debugger 110 is configured to interpret a debugger programming language. The debugger programming language may be a subset of the programming language in which the computer program being debugged is written. If the debugger is capable of debugging computer programs that are written in more than one programming language, then the debugger may be configured to interpret more than one debugger programming language, where each debugger programming language is a subset of one of the programming languages that the debugger is capable of debugging. A developer may write one or more debugger programming statements within the debugger itself in the debugger programming language. For example, the debugger may be configured with a command-line interface through which a developer may define one or more debugger programming statements in the debugger programming language.

The debugger 110 may include at least one parser 120 that is configured with an enhanced capability to parse programming statements written in the debugger programming language. The debugger 110 may serve as an interpreter of the debugger programming language such that the debugger 110 is capable of executing the one or more debugger programming statements written in the debugger programming language at various points of execution of the computer program during a debugging process of the computer program. As noted above, the debugger 110 may be configured to interpret more than one debugger programming language. As such, the debugger 110 may include one or more parsers 120, where each parser 120 is configured to parse debugger programming statements written in a particular debugger programming language that the debugger supports.

Values of variables declared in the computer program may be allocated and stored at addresses in the computer program address space 170. In addition, the debugger programming language provides a capability for declaring one or more variables. A variable declared in the debugger programming language may have its value allocated to and stored at an address in the debugger address space 160. Although a variable declared in the debugger may have its value stored at a memory address 180 in the debugger address space 160, the memory address 180 may point to a memory address 190 in the computer program address space 170. In this manner, any variables declared in the debugger and allocated to the debugger address space 160 may function as if those variables are allocated to and stored in the computer program address space 170. The debugger 110 is configured to perform the address space resolution necessary for variables declared in the debugger and stored in the debugger address space 160 to function as if they are stored in the computer program address space 170.

In this manner, a developer can mimic, for example, a data structure defined in the computer program by declaring one or more variables in the debugger and initializing those variables to corresponding variables in the computer program. The developer may then define one or more debugger programming statements in the debugger programming language that operate on the one or more variables declared in the debugger using data included in the computer program.

During the debugging process, it is sometimes necessary to traverse a data structure defined in the computer program in order to identify a corruption in the data structure. For example, if the data structure is a linked-list, through the aid of the debugger, the content of each node in the linked-list may be printed to identify which node(s) has the corrupted data. This can be accomplished by printing the content of the first node as a memory dump, identifying the memory address of the next node to which a pointer in the first node points, and printing the content of the next node as a memory dump. This procedure can be repeated until the content of each node in the linked-list has been printed.

Although in the case of a linked-list this procedure is relatively simple, when dealing with more complex data structures (e.g. trees, graphs, etc.), traversing the data structure in this manner is cumbersome. In one or more embodiments of the invention, the system 100 (FIG. 1) provides a developer with the capability to declare one or more debugger variables in the debugger and initialize these variables to variables declared in the computer program. Further, a developer can define one or more debugger programming statements in the debugger programming language that specify procedures to be performed on the debugger variables using data defined in the computer program.

For example, in order to print the content of a linked-list data structure (i.e. a linked sequence of nodes) defined in the computer program, a pointer may be declared in the debugger and initialized to the pointer declared in the computer program that points to the root node of the linked-list. A set of debugger programming statements may then be defined in the debugger programming language to traverse the linked-list and print the content of each node using the pointer declared in the debugger and data defined in the computer program, where the data may be, for example, a function that returns the memory address of each successive node to which a preceding node in the linked-list points.

In one or more embodiments of the invention, one of more debugger programming statements that alter a portion of the computer program being debugged may be written in the debugger programming language. The one or more debugger programming statements may also include an instruction to the debugger specifying at which point and in what manner the one or more debugger programming statements should be executed during an execution of the computer program. For example, the debugger may be instructed to insert the one or more debugger programming statements at a specified position in the computer program and execute the debugger programming statements at that position during execution of the computer program. Also, the debugger may be instructed to prevent the execution of a portion of the computer program (i.e. prevent the execution of one or more lines of code from the computer program). In addition, the debugger may be instructed to execute the one or more debugger programming statements in place of the execution of a portion of the computer program. These various embodiments of the invention will be described in greater detail below.

The debugger programming language may include various programming constructs including a conditional construct, a loop construct, a delete construct, a skip construct, and a capability for declaring a variable. An example of a conditional construct is an if/else statement. Examples of a loop construct include a while loop, a for loop, and a do/while loop. It should be noted that these examples are presented merely for illustrative purposes are not limiting. The delete construct may, for example, instruct the debugger to prevent the execution of one or more programming statements in a computer program being debugged. The skip construct may, for example, instruct the debugger to skip the execution of one or more programming statements. In one or more embodiments of the invention described herein, the one or more debugger programming statements may include one or more expressions that include at least one of the conditional construct, the loop construct, the delete construct, the skip construct, and a variable declaration.

Figure 2:
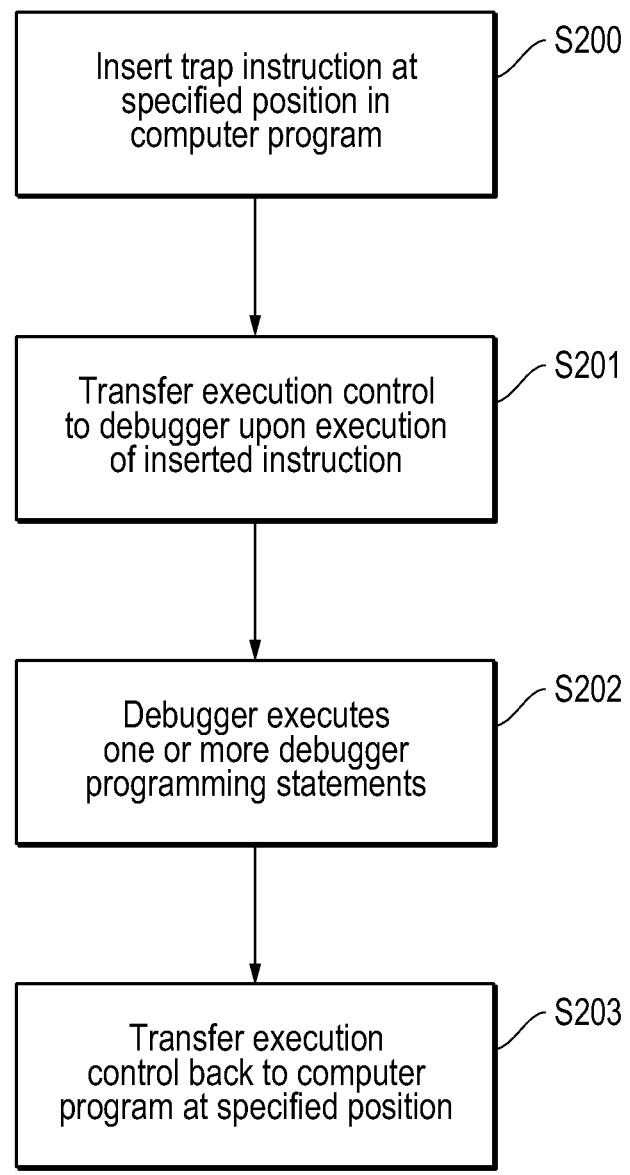
FIG. 2 sets forth a flow chart illustrating a method in accordance with an embodiment of the invention.

A method for providing programming support to a debugger in accordance with an embodiment of the invention is illustrated by way of the flowchart depicted in FIG. 2. In the method of this embodiment, the debugger is instructed to execute one or more debugger programming statements at a specified position in the computer program during execution of the computer program. Thus, in the method of this embodiment of the invention, a developer is able to achieve the equivalent of inserting programming statements into the computer program without actually having to modify the computer program itself. Thus, execution of the computer program can be altered without having to actually modify the computer program code and recompile the code. As such, efficiency of the debugging process is increased.

FIG. 2 depicts a method in accordance with an embodiment of the invention. In the method of this embodiment, the debugger executes one or more debugger programming statements at a specified point in a computer program during execution and debugging of the computer program. The various steps of this method may correspond to a process that results from the debugger's execution of a set of instructions provided to the debugger in the debugger programming language.

In an initial step, the debugger inserts an instruction at a specified position in the computer program (S200). Then, upon execution of the inserted instruction, execution control is transferred to the debugger (S201). After execution control is transferred to the debugger, the debugger then executes the one of more debugger programming statements that are defined in the debugger (S202). As an example, if the developer wants to insert one or more debugger programming statements before line 10 of the computer program code, the developer may define the one or more debugger programming statements in the debugger programming language and instruct the debugger to execute the debugger programming statements after line 9 of the computer program is executed. The debugger may then implement this by inserting an instruction in the computer program before line 10 that causes execution control to transfer from the computer program to the debugger upon execution of the inserted instruction. The debugger then executes the debugger programming statements.

After the debugger has completed execution of the one or more debugger programming statements, the debugger then transfers execution control back to the computer program at the specified position. With reference to the previously presented example, after the debugger completes execution of the debugger programming statements, the debugger transfers execution control back to the computer program before line 10. Then execution of the computer program proceeds from line 10. Accordingly, the method of this embodiment allows for debugger programming statements to be executed at a specific position within the computer program without a developer having to modify the computer code of the computer program itself and recompile the code.

Figure 3:
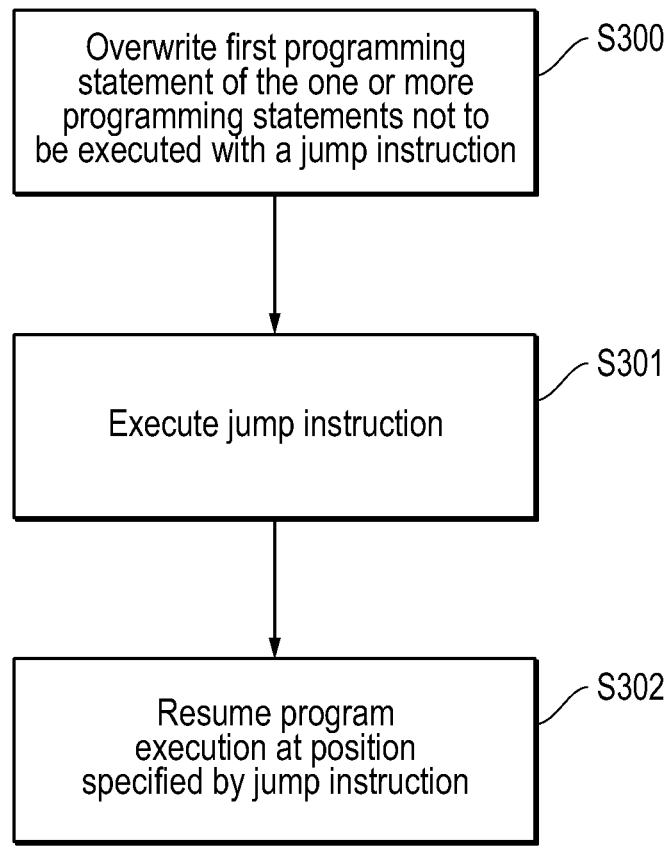
FIG. 3 sets forth a flow chart illustrating a method in accordance with an embodiment of the invention.

FIG. 3 illustrates a flow chart that depicts a method in accordance with another embodiment of the invention. In the method of this embodiment, the one or more debugger programming statements defined in the debugger include a delete instruction that instructs the debugger to prevent one or more programming statements at a specified position in the computer program from being executed.

More specifically, FIG. 3 depicts a method in accordance with an embodiment of the invention by which the debugger executes the delete instruction. The debugger overwrites a first programming statement of the one or more programming statements that are not to be executed with a jump instruction (S300). The jump instruction instructs the computer program to skip execution of the one or more programming statements and resume execution at a position in the computer program specified by the jump instruction. In step S301, the jump instruction is executed, and thereafter the computer program resumes execution at the position specified by the jump instruction (S302). The position specified by the jump instruction for resuming execution of the computer program may be at a position in the computer program that follows the position of the one or more programming statements whose execution was skipped.

As an example, the debugger programming statements may instruct the debugger to delete lines 10-15 of the computer program. The debugger may then execute this instruction by overwriting line 10 of the computer program with a jump instruction that specifies for execution to resume at line 16 of the computer program. Upon execution of the jump instruction, execution of lines 10-15 of the computer program will be skipped and execution will resume at line 16. Thereby, through use of the jump instruction, an effect of deleting lines 10-15 from the computer program is achieved. However, other portions of the computer program may include code that refers to lines 10-15 of the computer program. For example, at another position in the computer program, there may be a jump instruction to line 11. As such, the debugger can additionally implement a safety feature that replaces the one or more programming statements whose execution is to be skipped with an NOP instruction which does not perform a function or return a result. In this manner, even if other portions of the computer program code refer to the lines of code whose execution has been skipped, execution of the NOP instruction will replace execution of the skipped lines of code.

Figure 4:
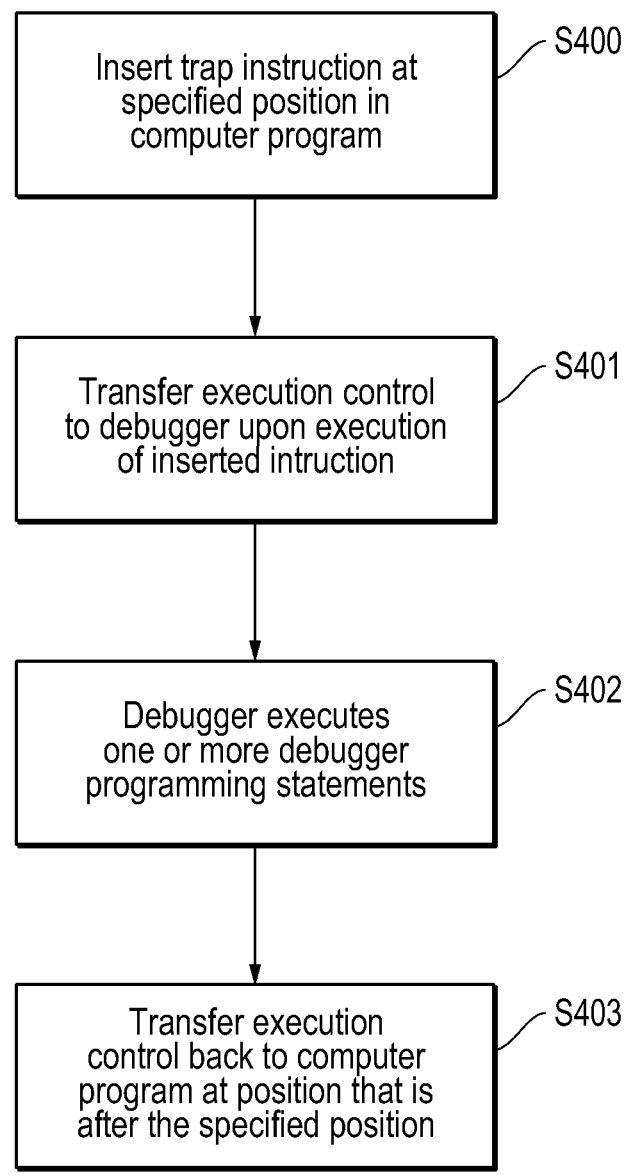
FIG. 4 sets forth a flow chart illustrating a method in accordance with an embodiment of the invention.

FIG. 4 depicts a method in accordance with an embodiment of the invention. In the method of this embodiment, the debugger is instructed to execute one or more debugger programming statements in lieu of one or more programming statements located at a specified position in the computer program. In step S400 of the method, the debugger inserts an instruction at a position in the computer program before the specified position of the one or more programming statements. Upon execution of the instruction, execution control is transferred to the debugger (S401). Upon receiving execution control, the debugger executes the one or more debugger programming statements (S402). Upon executing the one or more debugger programming statements, the debugger transfers execution control back to the computer program at a position in the computer program that is after the specified position of the one or more programming statements (S403).

As an example of the method of this embodiment, if the developer instructs the debugger to execute one or more debugger programming statements in lieu of programming statements at lines 10-12 of the computer program being executed, the debugger may implement this by inserting an instruction in the computer program before line 10 that causes execution control to transfer from the computer program to the debugger upon execution of the inserted instruction. The debugger then executes the debugger programming statements and returns control to the computer program at line 13. In this manner, execution of programming statements at lines 10-12 of the computer program has been replaced with execution of the one or more debugger programming statements. In this manner, lines of code in the computer program can effectively be modified without the need to alter the computer program code itself and recompile the code.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose.

What is claimed is:

1. A method for providing programming support to a debugger that debugs a computer program, the method comprising:
   defining at least one debugger programming statement in a debugger programming language, wherein the debugger is configured to interpret the debugger programming language, and wherein the debugger programming language is capable of declaring one or more variables; and
   instructing the debugger to execute the at least one debugger programming statement,
   wherein the debugger is configured to parse the at least one debugger programming statement defined in the debugger programming language,
   wherein the one or more variables declared in the debugger programming language are allocated to a debugger address space; and
   wherein the at least one debugger programming statement modifies at least a portion of the computer program during execution of the computer program without recompiling the computer program, and the computer program is embodied on a computer-readable storage medium.

2. The method of claim 1, wherein the debugger programming language is a subset of a programming language in which the computer program is written.

3. The method of claim 1, wherein the at least one debugger programming statement is defined by way of a command-line interface provided within the debugger.

4. The method of claim 2, wherein the debugger programming language comprises a conditional construct, a loop construct, a delete construct, a skip construct, and a capability for declaring a variable.

5. The method of claim 4, wherein the at least one debugger programming statement includes one or more expressions that include at least one of the conditional construct, the loop construct, the delete construct, the skip construct, and a variable declaration.

6. The method of claim 5, wherein the one or more variables point to an address in an address space of the computer program.

7. The method of claim 1, wherein the debugger is instructed to execute the at least one debugger programming statement at a specified position of the computer program during execution of the computer program.

8. The method of claim 7, wherein the debugger:
   inserts an instruction at the specified position during execution of the computer program, the instruction transferring execution control to the debugger;
   executes the at least one debugger programming statement; and
   transfers execution control to the computer program at the specified position upon execution of the at least one debugger programming statement.

9. The method of claim 1, wherein the at least one debugger programming statement includes a delete instruction that instructs the debugger to prevent one or more programming statements at a specified position in the computer program from being executed.

10. The method of claim 9, wherein the debugger executes the delete instruction by overwriting a first programming statement of the one or more programming statements at the specified position in the computer program with a jump instruction that instructs the computer program to skip execution of the one or more programming statements and resume execution at a position in the computer program specified by the jump instruction.

11. The method of claim 1, wherein the debugger is instructed to execute the at least one debugger programming statement instead of one or more programming statements at a specified position in the computer program being executed.

12. The method of claim 11, wherein the debugger:
   inserts an instruction at a position in the computer program before the specified position of the one or more programming statements, the instruction transferring execution control to the debugger;
   executes the at least one debugger programming statement; and
   transfers execution control to the computer program at a position in the computer program after the specified position of the one or more programming statements upon execution of the at least one debugger programming statement.

13. The method of claim 6, wherein the debugger is configured to perform address space resolution necessary for the one or more variables declared in the debugger programming language and stored in the debugger address space to function as if they are stored in the address space of the computer program.

* * * * *